US009679704B2

(12) United States Patent
Gadkaree et al.

(10) Patent No.: US 9,679,704 B2
(45) Date of Patent: Jun. 13, 2017

(54) CATHODE FOR A LITHIUM ION CAPACITOR

(71) Applicant: CORNING INCORPORATED, Corning, NY (US)

(72) Inventors: Kishor Purushottam Gadkaree, Painted Post, NY (US); Rahul Suryakant Kadam, Corning, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 458 days.

(21) Appl. No.: 14/610,868

(22) Filed: Jan. 30, 2015

(65) Prior Publication Data

US 2016/0225536 A1    Aug. 4, 2016

(51) Int. Cl.
| | |
|---|---|
| H01G 11/26 | (2013.01) |
| C01B 31/12 | (2006.01) |
| H01G 11/06 | (2013.01) |
| H01G 11/24 | (2013.01) |
| H01G 11/34 | (2013.01) |
| H01G 11/50 | (2013.01) |
| H01G 11/38 | (2013.01) |
| H01G 11/42 | (2013.01) |
| H01G 11/52 | (2013.01) |
| H01G 11/56 | (2013.01) |
| H01G 11/86 | (2013.01) |
| H02J 7/00 | (2006.01) |
| C01B 31/08 | (2006.01) |
| H01M 4/133 | (2010.01) |
| H01M 4/587 | (2010.01) |
| H01G 11/68 | (2013.01) |

(52) U.S. Cl.
CPC .......... *H01G 11/26* (2013.01); *C01B 31/081* (2013.01); *C01B 31/12* (2013.01); *H01G 11/06* (2013.01); *H01G 11/24* (2013.01); *H01G 11/34* (2013.01); *H01G 11/38* (2013.01); *H01G 11/42* (2013.01); *H01G 11/50* (2013.01); *H01G 11/52* (2013.01); *H01G 11/56* (2013.01); *H01G 11/86* (2013.01); *H01M 4/133* (2013.01); *H01M 4/587* (2013.01); *H02J 7/0068* (2013.01); *C01P 2006/12* (2013.01); *H01G 11/68* (2013.01); *Y02E 60/13* (2013.01)

(58) Field of Classification Search
CPC ........ H01G 9/22; H01G 9/0029; H01G 9/025; H01G 9/035; H01G 11/02; H01G 11/36; H01G 11/42; H01G 11/46; H01G 11/54; H01M 10/36; H01M 4/0416; H01M 4/50; Y01T 29/417
See application file for complete search history.

(56) References Cited

U.S. PATENT DOCUMENTS

| | | | |
|---|---|---|---|
| 7,283,349 B2 | 10/2007 | Yoshida et al. | |
| 7,582,902 B2 | 9/2009 | Tano et al. | |
| 7,625,839 B2 | 12/2009 | Hirahara et al. | |
| 7,964,173 B2 | 6/2011 | Oyama et al. | |
| 8,142,930 B2 | 3/2012 | Kojima et al. | |
| 8,318,356 B2 | 11/2012 | Gadkaree et al. | |
| 8,524,632 B2 | 9/2013 | Gadkaree et al. | |
| 8,541,338 B2 | 9/2013 | Gadkaree et al. | |
| 8,784,764 B2 | 7/2014 | Gadkaree et al. | |
| 2008/0165471 A1 | 7/2008 | Kojima et al. | |
| 2009/0214949 A1 | 8/2009 | Ugawa | |
| 2011/0002086 A1 | 1/2011 | Feaver et al. | |
| 2011/0182000 A1 | 7/2011 | Gadkaree et al. | |
| 2011/0261501 A1* | 10/2011 | Gadkaree ............... H01G 11/32 361/502 |
| 2012/0134075 A1 | 5/2012 | Kawai | |
| 2013/0148265 A1 | 6/2013 | Okuno et al. | |
| 2013/0194721 A1 | 8/2013 | Cho et al. | |
| 2013/0201606 A1 | 8/2013 | Nansaka et al. | |
| 2013/0202945 A1 | 8/2013 | Zhamu et al. | |
| 2013/0209348 A1 | 8/2013 | Ludvik et al. | |
| 2014/0079994 A1 | 3/2014 | Affinito et al. | |
| 2014/0101992 A1 | 4/2014 | Mennell et al. | |
| 2014/0134438 A1 | 5/2014 | Gadkaree et al. | |

(Continued)

FOREIGN PATENT DOCUMENTS

| | | |
|---|---|---|
| CN | 10126539 A | 9/2008 |
| EP | 0767505 A1 | 4/1997 |

(Continued)

OTHER PUBLICATIONS

International Search Report, issued in connection with corresponding PCT application No. PCT/US2015/061796, Apr. 13, 2016.
International Search Report and Written Opinion PCT/US2013/015244 Dated Jun. 2, 2016.
International Search Report and Written Opinion PCT/US2016/015033 Dated May 10, 2016.
International Search Report and Written Opinion PCT/US2016/015041 Dated Jun. 13, 2016.
International Search Report and Written Opinion PCT/US2016/015245 Dated May 12, 2016.
Shu et al. J. Electrochem. Soc., vol. 140, No. 4, 922-927, Apr. 1993.
International Search Report, issued in connection with corresponding PCT application No. PCT/US2016/015273, Apr. 15, 2016.
Chang et al., The Influence of Different Electrode Fabrication Methods and Poly(Vinylidene Fluoride) Binders on The Anode Electrode Dimension Stability and Cyclability in Lithium-Ion Batteries, Journal of New Materials for Electrochemical Systems 11, 43-47 (2008).

(Continued)

*Primary Examiner* — Dion R Ferguson
(74) *Attorney, Agent, or Firm* — John L. Haack

(57) ABSTRACT

A cathode in a lithium ion capacitor, including:
a carbon composition comprising: an activated carbon; a conductive carbon; and a binder in in amounts as defined herein; and
a current collector that supports the carbon composition, wherein the activated carbon has: a surface area of from 500 to 3000 m$^2$/g; a pore volume where from 50 to 80% of the void volume is in pores less than 10 Å; a pore volume higher than 0.3 cm$^3$/gm occupied by the micropores less than 10 Å; and a microporosity of greater than 60% of the total pore volume.
Also disclosed is a method of making the cathode and using the cathode in a lithium ion capacitor.

3 Claims, 4 Drawing Sheets

(56) References Cited

U.S. PATENT DOCUMENTS

| | | | |
|---|---|---|---|
| 2014/0146440 A1 | 5/2014 | Gadkaree et al. |
| 2014/0177136 A1 | 6/2014 | Kim et al. |
| 2014/0293507 A1 | 10/2014 | Gadkaree et al. |
| 2016/0087263 A1 | 3/2016 | Gadkaree et al. |
| 2016/0133394 A1 | 5/2016 | Sakshaug et al. |

FOREIGN PATENT DOCUMENTS

| | | |
|---|---|---|
| EP | 2958122 | 12/2015 |
| JP | 2004266239 A | 9/2004 |
| JP | 2005302300 | 10/2005 |
| JP | 2006086148 A | 3/2006 |
| JP | 2008289820 A | 12/2008 |
| JP | 2010118216 A | 5/2010 |
| WO | 2013/012521 | 1/2013 |
| WO | 2014062498 | 4/2014 |

OTHER PUBLICATIONS

Liu et al., Particles and Polymer Binder Interaction: A Controlling Factor in Lithium-Ion Electrode Performance, Journal of The Electrochemical Society, 159(3), A214-A221 (2012).

Yoo et al., Interaction of Poly(vinylidene fluoride) with Graphite Particles. 1. Surface Morphology of a Composite Film and Its Relation to Processing Parameters, Chem. Mater., 15, 850-861 (2003).

Yoo et al., Interaction of Poly(Vinylidene fluoride) with Graphite Particles. 2. Effect of Solvent Evaporation Kinetics and Chemical Properties of PVDF on the Surface of Morphology of a Composite Film and Its Relation to Electrochemical Performance, Chem. Mater., 16, 1945-1953 (2004).

Christian Lastoskie, et al., Pore Size Distribution Analysis of Microporous Carbons: A Density Functional Theory Approach, J. Phys. Chem., 1993, 97, 4786-4796.

* cited by examiner

US 9,679,704 B2

CATHODE FOR A LITHIUM ION CAPACITOR

CROSS-REFERENCE TO RELATED APPLICATIONS

The present application is related commonly owned and assigned USSN Application Nos., filed concurrently herewith:

Ser. No. 14/610,752, entitled "COKE SOURCED ANODE FOR LITHIUM ION CAPACITOR";

Ser. No. 14/610,782, entitled "ANODE FOR LITHIUM ION CAPACITOR";

Ser. No. 14/610,811, entitled "POLY-VINYLIDENE DIFLUORIDE ANODE IN A LITHIUM ION CAPACITOR"; and Ser. No. 14/610,848, entitled "PHENOLIC RESIN SOURCED CARBON ANODE IN A LITHIUM ION CAPACITOR"; but does not claim priority thereto.

BACKGROUND

The present disclosure relates to a cathode and a lithium ion capacitor.

SUMMARY

In embodiments, the disclosure provides an activated carbon having desired structural properties that permit the activated carbon to be used as a cathode material in a lithium ion capacitor.

In embodiments, the disclosure provides an activated carbon cathode in combination with a carbon sourced anode, and an anion, e.g., $PF_6^-$, based salt in the electrolyte.

In embodiments, the disclosure provides methods of making and using the activated carbon cathode and lithium ion capacitor articles.

BRIEF DESCRIPTION OF THE DRAWINGS

In embodiments of the disclosure.

DETAILED DESCRIPTION

Figure 1:
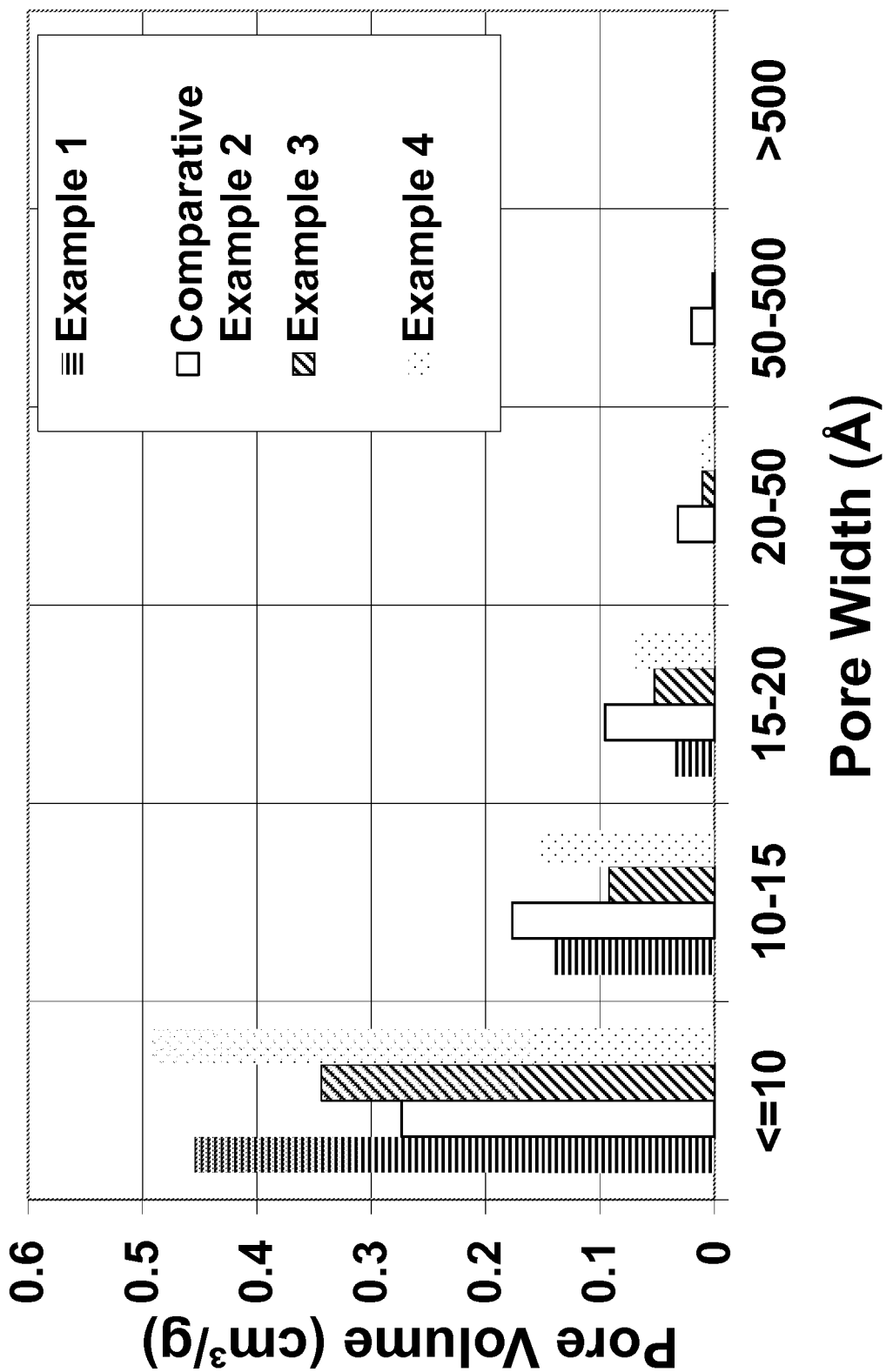
FIG. 1 shows pore size distributions for different activated carbon materials.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Features or aspects recited in any of the claims are generally applicable to all facets of the invention. Any recited single or multiple feature or aspect in any one claim can be combined or permuted with any other recited feature or aspect in any other claim or claims.

Definitions

"Lithium composite powder," "LCP", or like terms refer to an encapsulated lithium particle comprising: a core comprised of at least one of: lithium; a lithium metal alloy; or a combination thereof; and a shell comprised of a lithium salt, and an oil, where the shell encapsulates the core, and the particle has a diameter of from 1 to 500 microns (see commonly owned and assigned U.S. Ser. No. 13/673,019, filed Nov. 9, 2012, entitled "LITHIUM COMPOSITE PARTICLES," and U.S. Ser. No. 14/493,886, filed Sep. 23, 2014, entitled "ENCAPSULATED LITHIUM PARTICLES AND METHODS OF MAKING AND USE THEREOF"). The LCP can be used for pre-doping the anode.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Lithium ion capacitors (LICs) are a new class of innovative hybrid energy storage devices. Unlike electrochemical double layer capacitors (EDLC's) which store energy based on a double layer mechanism on both electrodes, the hybrid lithium ion capacitors store energy on the cathode via the double layer mechanism and energy storage on anode is via faradaic mechanism. As a result, the energy density in such devices can be five times greater than an EDLC, while maintaining the power also at a three to four time greater than an EDLC. In spite of the faradaic mechanism of energy storage, these devices still show very high cycle life in excess of 200,000 cycles, making the devices attractive for many applications.

LICs utilize a high surface area (e.g., typically greater than 1000 $m^2/g$) carbon on the positive electrode and an intercalating carbon with low porosity and low surface area (e.g., typically less than 300 m²/g) on the anode, which supports the fast intercalation and de-intercalation of lithium ions. During charge and discharge, lithium intercalation and de-intercalation occurs within the bulk of the negative electrode (i.e., anode), whereas, anion adsorption and desorption takes place on the positive electrode (i.e., cathode). The adsorption and desorption on the positive electrode is a non-faradaic reaction which is relatively faster than the lithium ion intercalation and de-intercalation on the negative electrode.

A lithium ion capacitor thus allows for about 1.5 times the voltage of that of an EDLC. The cell capacitance (C=Q/V) can be stated by the charge-discharge curve. Since the energy density and power are both proportional to square of the voltage there is significant increase in energy and power density of the device. In addition to the voltage related increase, the faradaic reaction also has significantly higher energy associated with it and contributes to an increase in the energy and power density of the LIC device. The anode (negative electrode) stays at a constant or even potential during the charging and discharging of the cell and majority of the potential swing is on the cathode (positive electrode) which is made from activated carbon. Since the activated carbon bears the majority of the potential swing when the lithium ion capacitor is charged and discharged, the activated carbon should be chemically and electrochemically stable between the voltage window. Because of the significantly higher potential range of the LIC device, i.e., operation at 3.8 to 4V compared to operation at 3V or less for EDLC's, and the chemistry of the electrolyte used in LIC device, i.e., ethylene carbonate-dimethyl carbonate, methyl propionate, fluorinated ethylene carbonate with lithium hexafluorophosphate, which is very different from nitrile based electrolytes with TEA-TFB used in EDLC's, it is not expected that the carbon that works well for an EDLC will also work well for a LIC. The requirements for porous carbon on a LIC cathode have not been studied or understood in the prior art literature.

During the charge process in a lithium ion battery, lithium ions are de-intercalated from the bulk of the cathode and transferred to the anode electrode via an ionic conduction mechanism through the electrolyte and intercalated into the bulk of the anode electrode. During the charge process, the electrons flow from the cathode to the anode. During the discharge process, the entire charge process is reversed. The lithium ions are de-intercalated from the bulk of the anode and transferred to the cathode via ionic conduction mechanism through the electrolyte. The transferred lithium ions are then intercalated into the bulk of the cathode. During the discharge process, the electrons are transferred from the anode to the cathode.

In contrast, in a lithium ion battery, energy is stored due to faradaic reaction on the anode and the cathode. The state of charge of the electrolyte is always neutral and constant which means there is no significant change in the concentration of electrolyte. The lithium ions responsible for the energy storage in a lithium ion battery depend completely on the number of lithium ions available in the cathode electrode. However, in a lithium ion capacitor as mentioned earlier, the anode electrode can be initially pre-doped with lithium metal which assists in increasing the operating voltage window. Lithium intercalation and de-intercalation occurs within the bulk of the anode, whereas (e.g., $PF_6^-$) adsorption and desorption takes place on the cathode. The anion adsorption and desorption on the cathode is a non-faradaic reaction, which is faster than the lithium ion intercalation and de-intercalation on the anode. In a lithium ion capacitor, the negative side or the anode is a lithium ion battery intercalating-deintercalating electrode, and the positive electrode or the cathode side is an EDLC adsorbing-de-adsorbing electrode. In a lithium ion capacitor, the concentration of the electrolyte changes depending on the state of the charge of the device since the electrolyte ions are responsible for storage of energy in the respective electrodes.

In embodiments, the present disclosure is directed to a carbon material, and use of the carbon in a cathode of a lithium ion capacitor. The data provided was obtained at desired high charge-discharge rates.

Typically, activated carbon is a carbon of choice on the cathode (i.e., the positive electrode) in a lithium ion capacitor. Since the cathode is an EDLC type adsorbing-de-adsorbing electrode, the structure of the carbon is different from the carbon used on the anode electrode (i.e., a hard carbon). Activated carbon is a porous carbon having a high surface area (e.g., greater than 1000 m²/g). The specific discharging capacity of the activated carbon can be correlated directly with the surface area, the pore volume, and the pore size distribution of the activated carbon. In turn, the surface area, the pore volume, and the pore size distribution of the activated carbon is directly related to the type of precursor, method of activation, and post activation treatment to the activated carbon. The specific discharging capacity of the activated carbon is given in mAh/gm and represents the amount of $PF_6^-$ ions it can adsorb during the charging process. The specific discharging capacity of an activated carbon can also be highly dependent on presence of the inorganic impurities and the different surface functional groups, which aspects can directly affect the electrochemical stability of the lithium ion capacitor. The higher the specific discharging capacity, the higher the capacity of the activated carbon to store $PF_6^-$ ions in a lithium ion capacitor. Certain structural properties of activated carbon have been identified that can be used to select a cathode material for high performance in a lithium ion capacitor. The presence of these structural properties can lead to a higher specific discharging capacity (mAh/gm) for $PF_6^-$ ions, superior discharge capacities in a full working lithium ion capacitor, and higher energy and higher power performance in a working lithium ion capacitor.

In embodiments, the disclosure provides a cathode in a lithium ion capacitor, comprising:

a carbon composition comprising: an activated carbon in from 85 to 95 wt %; a conductive carbon in from 1 to 8 wt %; and a binder in from 3 to 10 wt %; and a current collector that supports the carbon composition, wherein the activated carbon has:

a surface area of from 500 to 3000 m²/g;

a pore volume (e.g., larger than about 0.3 cm3/gm, for example,) of from 0.3 to 2 cm3/gm occupied by micropores having a diameter of less than 10 Angstroms (Å);

from 50 to 80% of the pore volume is in micropores having a diameter of less than 10 Å; and a microporosity, i.e., pore less than 20 Å, for example, a pore volume of greater than 60%, such as from 60 to 100% of the total pore volume.

In embodiments, the cathode can have a thickness, for example, of from 2 to 20 milli-inches, and the binder is a fluorine containing polymer.

In embodiments, the binder can be, for example, a polyvinylidine difluoride (PVDF) having a weight average molecular weight from 300,000 to 1,000,000.

In embodiments, the binder can be, for example, a polytetrafluoride ethylene (PTFE) having a weight average molecular weight of 500,000 to 1,000,000.

In embodiments, the activated carbon can be activated, for example, with alkali treatment, and the activated carbon has a surface area of 800 to 3000 m²/kg.

In embodiments, the activated carbon can be sourced, for example, from a non-lignocellulosic material, e.g., wheat flour, from a petroleum material, e.g., coke, or a combination thereof.

In embodiments, the disclosure provides a lithium ion capacitor, comprising:
the abovementioned cathode comprising:
a carbon composition comprising: an activated carbon in from 85 to 95 wt %; a conductive carbon in from 1 to 8 wt %; and a binder in from 3 to 10 wt %; and
a current collector that supports the carbon composition, wherein the activated carbon has: a surface area of from 500 to 3000 m²/g; a pore volume, e.g., larger than about 0.3 cm³/gm, for example, of from 0.3 to 2 cm³/gm occupied by micropores having a diameter of less than 10 Å; from 50 to 80% of the pore volume is in micropores having a diameter of less than 10 Å; and a microporosity, i.e., pore less than 20 Å, for example, a pore volume of greater than 60%, such as from 60 to 100% of the total pore volume; and
an anode comprising a coconut shell sourced carbon, a conductive carbon, and a binder, coated on a conductive substrate.

In embodiments, the lithium ion capacitor can further comprise, for example, a lithium composite powder (LCP) coated on at least a portion of the coated anode surface.

In embodiments, the lithium ion capacitor can further comprise, for example:
a cell comprising a stack of:
the aforementioned anode having a lithium composite powder (LCP) coated on at least a portion of the coated anode surface;
the aforementioned cathode; and
a separator situated between the anode and cathode.

In embodiments, the lithium ion capacitor can further comprise, for example: a non-aqueous electrolyte.

In embodiments, the cell can be, for example, a jelly roll configuration, a stacked configuration, or like lithium ion capacitor configurations.

In embodiments, the cell can have, for example, a cathode discharge capacity of from 25 to 100 mAh/gm, and a maximum energy density of from 25 to 60 Wh/l.

In embodiments, the disclosure provides a method of making the aforementioned cathode, comprising:
activating, i.e., heat treating, a non-lignocellulosic sourced carbon material at from 500 to 1000° C. for from 1 to 10 hrs, in an inert atmosphere to produce activated particles;
treating the activated particles with an acid, and then neutralizing;
heat treating the neutralized particles, i.e., the activated and acid and neutralized non-lignocellulosic material, e.g., wheat flour, at from 500 to 1000° C. for from 1 to 10 hrs, in an inert atmosphere;
mixing the heat treated particles with a binder, and a solvent to form a mixture; and
applying the mixture to a conductive current collector to form the cathode.

In embodiments, the non-lignocellulosic sourced carbon particles can be selected from, for example, a wheat flour, corn flour, potato flour, rice flour, or a mixture thereof (see for example, commonly owned and assigned EP2735007A1, at para. 20-28, the disclosure of which is incorporated herein).

In embodiments, the method can further comprise, for example, including a conductive carbon in an amount of from 1 to 8 wt % (by weight of the total mixture) in the mixture prior to applying the mixture to a conductive current collector to form the cathode.

In embodiments, the disclosure provides a method of using the abovementioned lithium ion capacitor, comprising:
charging the lithium ion capacitor;
discharging the lithium ion capacitor;
or combinations thereof.

In embodiments, the method of using the lithium ion capacitor cell can have a cathode discharge capacity, for example, of from 25 to 100 mAh/gm, and a maximum energy density of from 25 to 60 Wh/l.

In embodiments, the method of using can further comprise discharging the capacitor in combination with at least one of, for example: a vehicle, an electronic appliance, a consumer electronic device, a component of an electrical grid system, or a combination thereof. The other combined system has a need for storage, supply, or both, of electric power. A vehicle can be, for example, a mobile machine that transports, for example, people, cargo, or a purposeful payload, such as camera or an military ordinance in a drone or unmanned aerial system (UAS). Other examples of vehicles are wagons, bicycles, motor vehicles (e.g., motorcycles, cars, trucks, buses, trains), watercraft (e.g., ships, boats), spacecraft, aircraft, or combinations thereof.

In embodiments, the charging and discharging is repeated a plurality of cycles, for example, from 2 to 1,000,000 cycles or more.

Figure 4:
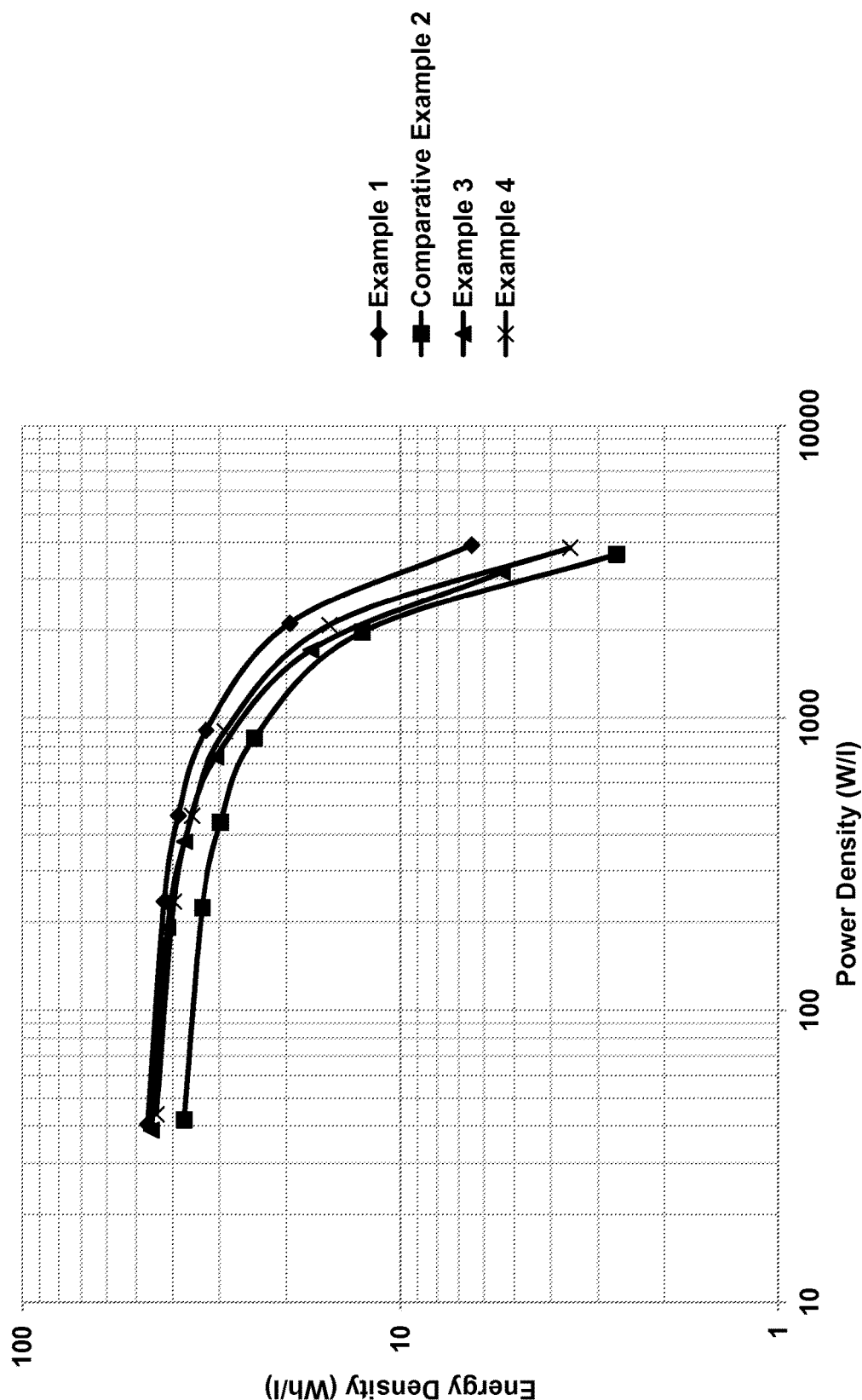
FIG. 4 shows a Volumetric Ragone Plot for the different activated carbons in a full working lithium ion capacitor.

In embodiments, the present disclosure is advantaged in several aspects, including for example: improvement in energy and power density at lower and higher discharge rates in a working lithium ion capacitor. Carbon 1 in Example 1 shows a 72.22% V≤10 Å, carbon 3 in example 3 shows a 68.51% V≤10 Å, and carbon 4 in example 4 shows a 67.41% V≤10 Å, i.e., the total pores having a pore size less than 10 Angstroms when compared to carbon 2 in Comparative Example 2, which has a 45.72% V≤10 Å as shown in Table 1. As a result of the higher percentage of carbon having a pore size less than 10 Angstroms, the respective carbons in Example 1, Example 3, and Example 4 exhibit an energy density of 46.64 Wh/l, 45.57 Wh/l, and 44.24 Wh/l, respectively compared to an energy density of 37.37 Wh/l for carbon 2 in Comparative Example 2, and as shown in FIG. 4. Similarly, as shown in FIG. 4, at a 100 C discharge rate the carbons in Example 1, 3, and 4, provide a power density of 6.46 W/l at 3907.81 Wh/l, 5.36 W/l at 3159.78 Wh/l and 3.55 W/l at 3828.86 Wh/l, respectively, compared to the carbon 2 in Comparative Example 2, which provides a power and energy density of 2.67 W/l at 3633.50 Wh/l at 100 C discharge rate.

Comparison of the performance of the disclosed activated carbon cathodes based on the various porous carbons having different structural features is provided and the key characteristics for a high performance cathode are defined. A carbon having a majority of its pores, that is, a pore volume of less than about 10 Å, was presently demonstrated to perform significantly better than a carbon having a higher pore volume in the large pore range of from 10 to 200 Å. The experimental results demonstrate that a carbon having a pore size of less than or equal to 10 Å at 72.22% of the total pore volume performed best among the carbons that were evaluated in a LIC cathode in power and in energy density measurements, indicating that lower pore size contributed to the higher energy density but also unexpectedly did not result in higher resistance as shown in the EIS data contrary to expectation.

In embodiments, the disclosure relates to energy storage and significant energy storage applications.

In embodiments, the disclosure provides a device for energy storage and energy discharge or production having significantly improved performance properties, as defined herein.

In embodiments, the disclosed device has significantly improved performance advantages.

In embodiments, the disclosed cathode provides energy and power improvements in device performance, which performance is unexpected and not generally observed in this type of device.

In embodiments, the disclosure provides a cathode, i.e., positive electrode for the lithium ion capacitor (LIC).

In embodiments, the disclosure provides a conductive carbon component, which when combined with other conductive additives and non-conductive binders, permits the fabrication of a high performance electrode and improves the overall device performance.

In embodiments, the disclosure provides a method of making the carbon, and a cathode including the carbon, and a lithium ion capacitor including the cathode.

In embodiments, the disclosure provides a performance comparison of the inventive cathodes with an electrodes made from another prior art material.

In embodiments, the disclosure provides an activated carbon based cathode in a lithium ion capacitor with $PF_6^-$ anion based electrolyte.

In embodiments, the disclosure compares performance of different activated carbons from different precursors and different activation protocols such as wheat flour alkali activated carbon, coconut shell sourced steam activated carbon, and coke sourced alkali activated carbon, with each carbon having a different structural properties (e.g., pore size distribution and pore volume) as a cathode electrode material for a lithium ion capacitor.

As mentioned above, a porous carbon having a high specific discharge capacity for $PF_6^-$ ions is needed for LIC cathodes. Specific discharge capacity is a quantitative measure of the activated carbon material's ability to store charge. Specific discharge capacity is an intrinsic property of an activated carbon material. In the present disclosure it was found that the specific discharge capacity of the activated carbon material depends on the structure of the activated carbon, and that the pore size distribution is a significant structural aspect of an activated carbon for lithium ion capacitor applications. Pore size distribution describes the different ranges of sizes of pores available and the total pore volume occupied by the different ranges of sizes of pores in a given sample of activated carbon. The pore size distribution is tailored depending on the application of the activated carbon. Since $LiPF_6$ is a salt of choice in a lithium ion capacitor, and activated carbon is used on the cathode electrode, the pore size of the activated carbon is tailored for $PF_6^-$ ions in a lithium ion capacitor. The specific capacities directly reflect on the significant performance aspects of a cell. A higher specific capacity is a desirable property in an activated carbon on the cathode side as it will directly and positively affect the packaging volume of a cell which in turn will positively affect the energy and power density in a lithium ion capacitor device. It is significant to note that the specific discharge capacity must be measured at high rates since a capacitor is a power device, unlike energy device such as a battery, where the rates are significantly lower. The specific discharge capacity of materials at high rates will be different than at low rates and may affect the ranking of the materials in terms of performance. The material structure also controls the diffusion rate of $PF_6^-$ ions into the structure.

FIG. 1 is a pore size distribution chart for carbon 1, carbon 2, carbon 3, and carbon 4. Table 1 lists the volume % fraction of the volume occupied by ranges of specific pore sizes. Carbon 1 shows a pore size only up to 20 Å with no mesoporosity as opposed to relatively high mesoporosity seen in carbon 2, carbon 3, and carbon 4. Carbon 1 and carbon 4 showed higher pore volume (0.455 cm³/gm) and (0.49 cm³/gm), respectively, occupied by less than or equal to a 10 Å pore size compared to the pore volume for carbon 2 (0.27 cm³/g) and carbon 3 (0.27 cm³/g) occupied by less than or equal to a 10 Å pore size. Also, carbon 1 shows 72.22% of the total pore volume occupied by the less than or equal to 10 Å pores, whereas carbon 2 shows 45.72%, carbon 3 shows 68.51%, and carbon 4 shows 67.47% of the total pore volume occupied by the less than or equal to 10 Å pores. The higher the volume occupied by the 10 Å pores, the greater the surface area, and the greater the specific capacity for $PF_6^-$ ions. Half-cell data in Table 2 corroborates the observation made from the pore size distribution data. The carbon 1 had a $PF_6^-$ desorption capacity (i.e., a specific capacity) of 58.06 mAh/gm when compared to carbon 2, which both had a 45.36 mAh/gm $PF_6^-$ desorption (specific) capacity. Carbon 3 had a 55.99 mAh/gm $PF_6^-$ desorption (specific) capacity. Carbon 4 had a $PF_6^-$ desorption capacity (specific capacity) of 69.2 mAh/gm. From the observation made from pore size distribution, the half-cell data suggests that the pore less than or equal to 10 Å completely regulate the specific capacity for $PF_6^-$ ions and are significant or indispensable for the superior performance of the lithium ion capacitor. The data from pore size distribution and half-cell measurements are in complete agreement when the respective activated carbons are used as cathode materials in a full lithium ion capacitor. A cathode based on carbon 1, carbon 3, or carbon 4, showed a superior performance in a full working lithium ion capacitor when compared to a cathode made from comparative carbon 2 (FIG. 4). The details of the full working capacitor are presented in the working examples below.

EXAMPLES

The following Examples demonstrate making, use, and analysis of the disclosed cathode and LIC article, and methods in accordance with the above general procedures.

Example 1

Carbon 1

Figure 2:
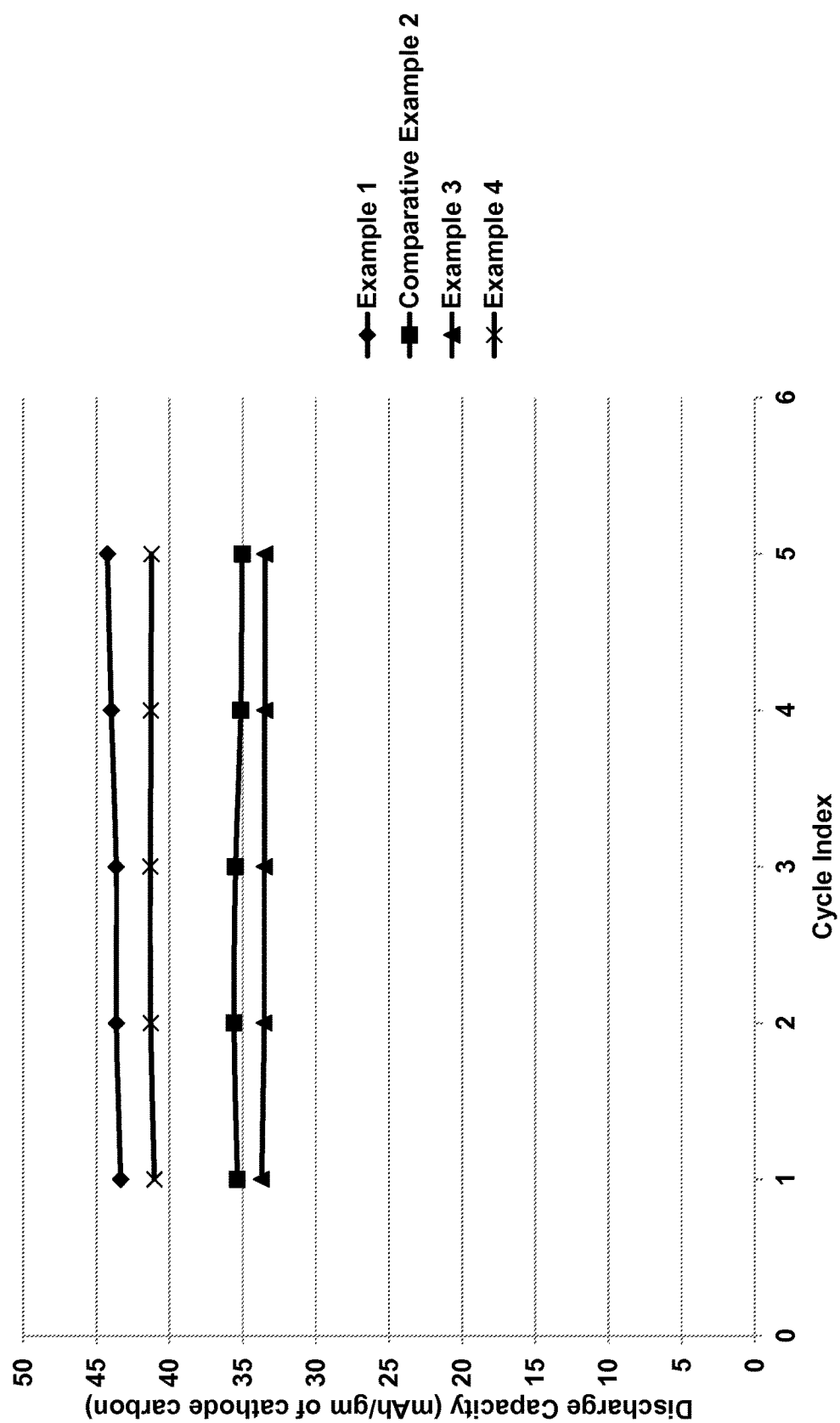
FIG. 2 shows discharge capacities for the different activated carbons in a working lithium ion capacitor.
Figure 3:
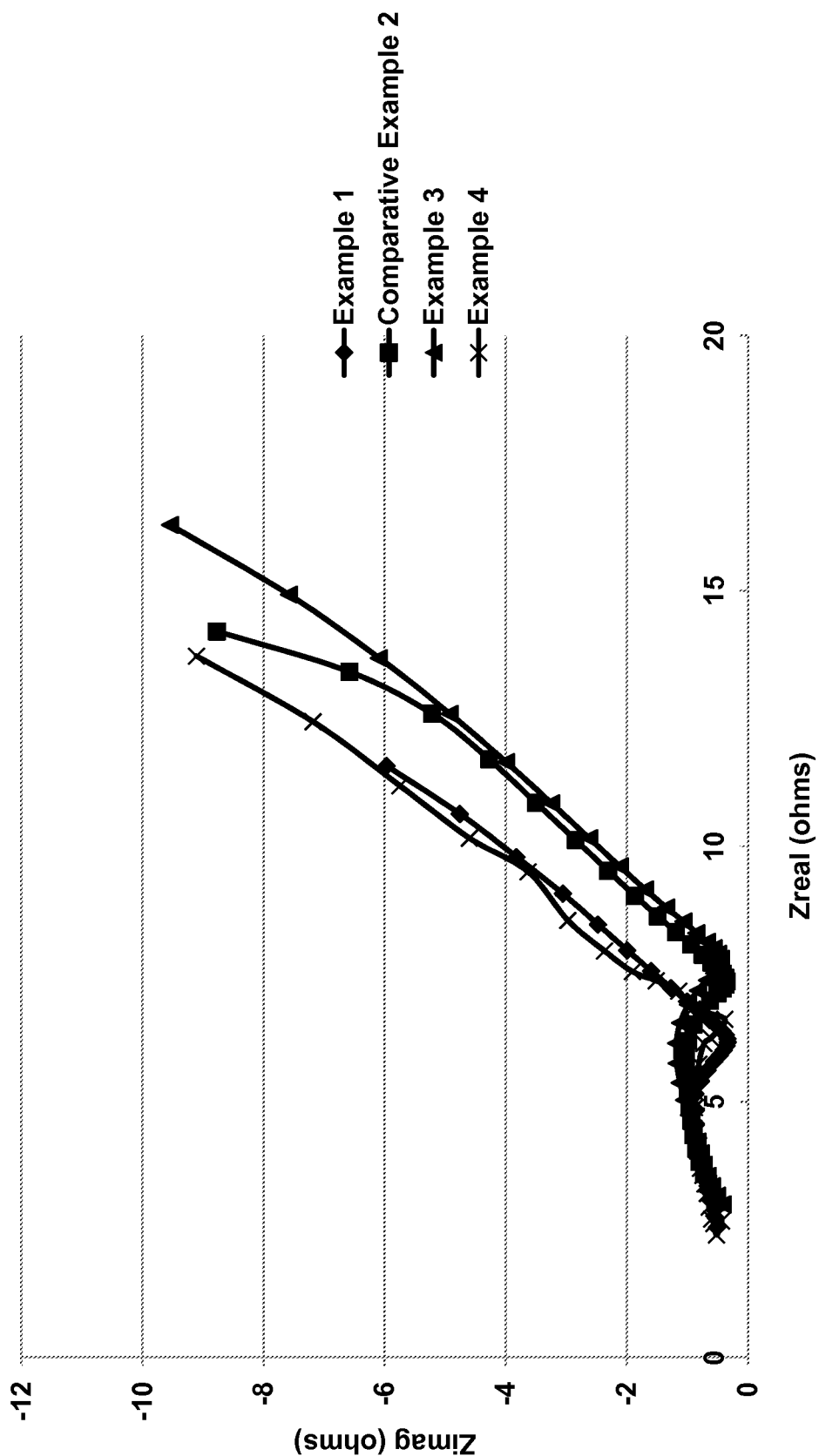
FIG. 3 shows Electrochemical Impedance Spectroscopy ("EIS") spectra at 3.8V for the different activated carbons.

Carbon 1 was obtained from in-house experiments at Corning, Incorporated, and was made from a wheat flour source as the precursor and carbonized at 800° C. The carbonized carbon was ground to particle size of approximately 5 microns. The ground carbonized carbon was then activated at 750° C. with KOH (alkali) with a ratio of 2.2:1 KOH:carbon for 2 hrs. The carbon was further washed with water to remove any remaining KOH. The resulting activated carbon was then treated with aqueous HCl to neutralize any trace of KOH and then washed with water to a neutral pH. The activated carbon was then heat-treated under nitrogen/forming gas at 900° C. for 2 hrs. The resulting carbon 1 was used to make cathodes. The cathode electrodes consisted of 85 wt % carbon 1, 10 wt % PTFE (DuPont 601A Teflon PTFE), and 5 wt % Cabot Black Pearl 2000 conductive carbon. A mixture of the activated carbon and the conductive carbon was mixed in a ball mill for 10 mins at 350 rpm, and the 10 wt % PTFE was added and the mixture was ball milled for another 20 mins at 300 rpm. The resulting mixed powder mixture was dry rolled in a calendaring machine to form a carbon film of appropriate thickness of, for example, 13.5 milli-inches. The carbon film was laminated on the Conductive Services, Inc. (CSI), current collector by passing the current collector and carbon film through a rolling mill. The calendared electrodes were punched to make 14 mm diameter circular electrodes. The punched electrodes were the dried overnight at 120° C. under vacuum. Half-cells were built with a lithium metal foil as the anode and the carbon 1 based electrodes as cathode. The half-cells were built in a CR-2032 coin cell format and were cycled from an open circuit voltage (OCV) of the cell to 3.8. V at a slow current of 0.00015 A. The half-cell with carbon 1 showed a $PF_6^-$ ion desorption (specific) capacity of 58.06 mAh/gm (Table 2). A full working lithium ion capacitor was constructed. The anodes included 90 wt % of coconut shell sourced carbon (1000° C. carbonized; aq. HCl; 1000° C. heat treated), 5 wt % PVDF, and 5 wt % Timcal Super C-45 conductive carbon. The slurry was coated on an Oak-Mitsu acquired copper foil. A Lithium Composite Powder (LCP) was used as a lithium metal source and 5 mg of the LCP was coated on the surface of the anode electrode. The LCP consisted of a lithium metal core with a protective coating of a mixture of lithium hexafluorophosphate ($LiPF_6$) and mineral oil. The weight ratio of lithium metal (core) to the mixture of $LiPF_6$ and mineral oil (shell or protective coating) was 80:20. The weight ratio of $LiPF_6$ to mineral oil in the protective coating was 89:11. An NKK-4425 separator from Nippon Kodoshi Corporation was selected, and a 1 M $LiPF_6$ in EC/DMC/MP (20:20:60 by vol %), and 5 wt % by superaddition of FEC was used as electrolyte. The anodes were coupled with the carbon 1 based cathodes. The cells were built in a CR2032 format. The cells were conditioned for five cycles at a current of 0.0005 A from 2.2V to 3.8V followed by the conditioning. EIS spectra was done on the cells followed by a C-Rate test where the cells were charged at 1 C rate and discharged at different rates between 2.2V and 3.8V. The discharge capacity for carbon 1 was 44.23 mAh/gm (see FIG. 2). The discharge capacity was calculated from the fifth conditioning cycle and normalized with the weight of the activated carbon on the cathode. The lithium ion capacitor having a carbon 1 based cathode showed a resistance of 6.01 ohms (see FIG. 3). The lithium ion capacitor having carbon 1 had an energy density of 46.64 Wh/l and power density of 40.65 W/l at about 1 C rate (see FIG. 4).

TABLE 1

% Fraction of total pore volume and pore size distribution.

| Carbon Type | $DFT^1$. Total Pore Volume ($cm^3/g$) | ≤10 Å V ≤10 Å ($cm^3/g$) | 10-15 Å V10-15 Å ($cm^3/g$) | 15-20 Å V15-20 Å ($cm^3/g$) | 20-50 Å V20-50 Å ($cm^3/g$) | 50-500 Å V50-500 Å ($cm^3/g$) | >500 Å V >500 Å ($cm^3/g$) |
|---|---|---|---|---|---|---|---|
| Carbon 1 | 0.63 | 0.46 | 0.14 | 0.04 | 0.00 | 0.00 | 0.00 |
| Carbon 2 | 0.60 | 0.27 | 0.18 | 0.10 | 0.03 | 0.02 | 0.00 |
| Carbon 3 | 0.50 | 0.34 | 0.09 | 0.05 | 0.01 | 0.00 | 0.00 |
| Carbon 4 | 0.73 | 0.49 | 0.15 | 0.07 | 0.01 | 0.00 | 0.00 |

| Carbon Type | % Volume Fraction of Total Pore volume | | | | | |
|---|---|---|---|---|---|---|
| | V ≤10 Å | V10-15 Å | V15-20 Å | V20-50 Å | V50-500 Å | V >500 Å |
| Carbon 1 | 72.22 | 22.22 | 5.56 | 0.00 | 0.00 | 0.00 |
| Carbon 2 | 45.72 | 29.57 | 15.99 | 5.36 | 3.36 | 0.00 |
| Carbon 3 | 68.51 | 18.42 | 10.49 | 2.17 | 0.41 | 0.00 |
| Carbon 4 | 67.47 | 20.87 | 9.52 | 1.62 | 0.52 | 0.00 |

[1]DFT refers to the Density Functional Theory (DFT) model that was used to calculate pore size distributions. In this model, the adsorption isotherms predicted by non-local mean field theory for each slit pores are correlated as a function of pressure and pore width. The pore size distribution is then calculated by fitting this correlation to the experimental adsorption isotherm of the adsorbing sorbent (see *J. Phys. Chem.* 1993, 97, 4786-4796).

Comparative Example 2

Comparative Carbon 2

Carbon 2 (YP-50F), an activated carbon, was obtained from Kuraray Carbon and was used as received. The carbon was used to make cathodes including 85 wt % carbon 2, 10 wt % PTFE (DuPont 601A Teflon PTFE), and 5 wt % Cabot Black Pearl 2000 conductive carbon. The mixture of the activated carbon and Cabot Black Pearl 2000 was mixed in a ball mill for 10 mins at 350 rpm, then the 10 wt % PTFE was added, and the mixture was ball milled for another 20 mins at 300 rpm. The resulting mixture was dry rolled in a calendaring machine to form a carbon film of appropriate thickness of, for example, 13.5 milli-inches. The carbon film was laminated on the Conductive Services, Inc. (CSI), current collector by passing the current collector and carbon film through a rolling mill. The calendared electrodes were punched to make 14 mm diameter circular electrodes. The punched electrodes were the dried overnight at 120° C. under vacuum. Half-cells were built with lithium metal foil as the anode and carbon 2 sourced mixture as the cathode. The half-cells were built in CR-2032 coin cell format and were cycled from OCV of the cell to 3.8 V at slow current of 0.00015 A. The half-cell with the carbon 2 mixture showed $PF_6^-$ ion desorption (specific) capacity of 45.36 mAh/gm (see Table 2). Full working lithium ion capacitors were constructed.

The anodes included 90 wt % coconut shell sourced carbon (1000° C. carbonized; aq. HCl; 1000° C. heat treated), 5 wt % PVDF, and 5 wt % Timcal Super C-45 conductive. The slurry was coated on Oak-Mitsu acquired copper foil as above. A Lithium Composite Powder (LCP)

was used as a lithium metal source and 5 mg of the LCP was coated on the surface of the anode electrode. The LCP consisted of a lithium metal core with a protective coating of a mixture of lithium hexafluorophosphate ($LiPF_6$) and mineral oil. The weight ratio of lithium metal (core) to the mixture of $LiPF_6$ and mineral oil (shell or protective coating) was 80:20. The weight ratio of $LiPF_6$ to mineral oil in the protective coating was 89:11. An NKK-4425 separator from Nippon Kodoshi Corporation was selected, and 1 M $LiPF_6$ in EC/DMC/MP (20%:20%:60% by vol %) and 5 wt % FEC by superaddition was used as the electrolyte. The above anode was coupled with the above carbon 2 source cathode. The cells were built in a CR2032 format. The cells were conditioned for five cycles at a current of 0.0005 A from 2.2V to 3.8V. followed by the conditioning, EIS spectra was done on the cells followed by C-Rate test where the cells were charged at 1 C rate and discharged at different rates between 2.2V and 3.8V. The discharge capacity for the LIC containing the carbon 2 cathode was 35.03 mAh/gm (see FIG. 2). The discharge capacity was calculated from the fifth conditioning cycle and normalized with the weight of the activated carbon on the cathode. The lithium ion capacitor having the carbon 2 based cathode showed a resistance of 7.35 ohms (see FIG. 3). The lithium ion capacitor having the carbon 2 based cathode had an energy density of 37.37 Wh/l and power density of 42.03 W/l at about 1 C rate (see FIG. 4).

Example 3

Carbon 3

Carbon 3 was prepared at Corning, Inc., and was made with a coke source as the precursor. Conoco Rodeo Green Coke was obtained from Conoco Phillips Co. The coke was dried under vacuum or nitrogen atmosphere at 120° C. overnight. The dried green coke was ground to a particle size of approximately 5 microns. The ground green coke was then activated at 800° C. with KOH (alkali) with a ratio of 1.5:1 KOH:carbon for 2 hrs. The carbon was further washed with water to remove any remaining KOH. The resulting activated carbon was then treated with aqueous HCl to neutralize any trace of KOH, and then washed with water to a neutral pH. The activated carbon was then heat-treated under nitrogen/forming gas at 480° C. for 2 hrs. The resulting carbon was used to make cathodes that included 85 wt % carbon 3, 10 wt % PTFE (DuPont 601A Teflon PTFE), and 5 wt % Cabot Black Pearl 2000. The mixture of the activated coke sourced carbon and Cabot Black Pearl 2000 was mixed in a ball mill for 10 mins at 350 rpm, then the 10 wt % PTFE was added to the mixture and ball milled for another 20 mins at 300 rpm. The resulting mixture was dry rolled in a calendaring machine to form a carbon film of appropriate thickness of, for example, 13.5 milli-inches. The carbon film was laminated on the Conductive Services, Inc. (CSI), current collector by passing the current collector and carbon film through a rolling mill. The calendared electrodes were punched to make 14 mm diameter circular electrodes. The punched electrodes were the dried overnight at 120° C. under vacuum. Half-cells were built with lithium metal foil as the anode and the carbon 3 sourced electrode as the cathode. The half-cells were built in CR-2032 coin cell format and were cycled from OCV of the cell to 3.8 V at slow current of 0.00015 A. The half-cell with carbon 3 showed $PF_6^-$ ion desorption (specific) capacity of 55.99 mAh/gm (see Table 2). Full working lithium ion capacitors were constructed with the carbon 3 cathodes. The anodes consisted of a 90 wt % coconut shell (1000° C. carbonized;

aq. HCl; 1000° C. heat treated) sourced carbon, 5 wt % PVDF, and 5 wt % Timcal Super C-45. The slurry was coated on an Oak-Mitsu acquired copper foil. A Lithium Composite Powder (LCP) was used as a lithium metal source and 5 mg of the LCP was coated on the surface of the anode electrode. The LCP consisted of a lithium metal core with a protective coating of a mixture of lithium hexafluorophosphate ($LiPF_6$) and mineral oil. The weight ratio of lithium metal (core) to the mixture of $LiPF_6$ and mineral oil (shell or protective coating) was 80:20. The weight ratio of $LiPF_6$ to mineral oil in the protective coating was 89:11. An NKK-4425 separator from Nippon Kodoshi Corporation was selected, and used with an electrolyte consisting of 1 M $LiPF_6$ in EC/DMC/MP (20:20:60 vol %) with 5 wt % FEC by superaddition. The anodes were coupled with carbon 3 sourced cathodes. The cells were built in a CR2032 format and conditioned for five cycles at a current of 0.0005 A from 2.2V to 3.8V followed by the conditioning. EIS spectra was done on the cells followed by C-Rate test where the cells were charged at 1 C rate and discharged at different rates between 2.2V and 3.8V. The discharge capacity for the LIC containing the carbon 3 sourced cathode was 33.46 mAh/gm (see FIG. 2). The discharge capacity was calculated from the fifth conditioning cycle and normalized with the weight of the activated carbon on the cathode. The lithium ion capacitor including the carbon 3 sourced cathode had a resistance of 7.51 ohms (see FIG. 3). The lithium ion capacitor including the carbon 3 sourced cathode had an energy density of 45.57 Wh/l and power density of 38.68 W/l at about 1 C rate (see FIG. 4).

TABLE 2

Half-cell data for different carbons.

| Carbon Type | Cycle | $PF_6^-$ Desorption Capacity (mAh/g) |
|---|---|---|
| carbon 1 | 1 | 58.06 |
|  | 2 | 57.58 |
| comparative carbon 2 | 1 | 45.36 |
|  | 2 | 46.41 |
| carbon 3 | 1 | 55.99 |
|  | 2 | 51.71 |
| carbon 4 | 1 | 69.2 |
|  | 2 | 69.07 |

Example 4

Carbon 4

Carbon 4 was prepared at Corning, Inc., and was made with a wheat flour source as a precursor that was carbonized at 800° C. ("Corning carbon"). The carbonized carbon was ground to particle size of approximately 5 microns. The ground carbonized carbon was then activated at 750° C. with KOH (alkali) with a ratio of 2.2:1 KOH:carbon for 2 hrs. The carbon was further washed with water to remove any remaining KOH. The resulting activated carbon was then treated with aq. HCl to neutralize residual KOH and then washed with water to a neutral pH. The resulting carbon was used to make LIC cathodes including 85 wt % Carbon 4, 10 wt % PTFE (DuPont 601A Teflon PTFE), and 5 wt % Cabot Black Pearl 2000. The mixture of the activated carbon and the Cabot Black Pearl 2000 was mixed in a ball mill for 10 mins at 350 rpm, then the 10 wt % PTFE was added and the mixture ball mill for another 20 mins at 300 rpm. The resulting mixture was dry rolled in a calendaring machine to form a carbon film of appropriate thickness of, for example, 13.5 milli-inches. The carbon film was laminated on the Conductive Services, Inc. (CSI), current collector by passing the current collector and carbon film through a rolling mill. The calendared cathodes were punched to make 14 mm diameter circular electrodes. The punched cathodes were then dried overnight at 120° C. under vacuum. Half-cells were built with lithium metal foil as the anode and the carbon 4 sourced mixture on the current collector as the cathode. The half-cells were built in CR-2032 coin cell format and were cycled from OCV of the cell to 3.8 V at slow current of 0.00015 A. The half-cell with carbon 4 showed a $PF_6^-$ ion desorption (specific) capacity of 69.20 mAh/gm (see Table 2). Full working lithium ion capacitors were constructed. The anodes consisted of 90 wt % coconut shell (1000° C. carbonized; aq. HCl; and 1000° C. heat treated) sourced carbon, 5 wt % PVDF, and 5 wt % Timcal Super C-45. The slurry was coated on an Oak-Mitsu copper foil. A Lithium Composite Powder (LCP) was used as a lithium metal source and 5 mg of the LCP was coated on the surface of the anode electrode. The LCP consisted of a lithium metal core with a protective coating of a mixture of lithium hexafluorophosphate ($LiPF_6$) and mineral oil. The weight ratio of lithium metal (core) to the mixture of $LiPF_6$ and mineral oil (shell or protective coating) was 80:20. The weight ratio of $LiPF_6$ to mineral oil in the protective coating was 89:11. An NKK-4425 separator from Nippon Kodoshi Corporation was selected, and used with an electrolyte of 1 M $LiPF_6$ in EC/DMC/MP (20:20:60 by vol %) with 5 wt % FEC by superaddition. The anodes were coupled with carbon 4 sourced cathodes mentioned above. The cells were built in a CR2032 format. The cells were conditioned for five cycles at a current of 0.0005 A from 2.2V to 3.8V followed by the conditioning. EIS spectra was accomplished on the cells followed by C-Rate testing where the cells were charged at 1 C rate and discharged at different rates between 2.2V and 3.8V. The discharge capacity for carbon 4 was 41.22 mAh/gm (see FIG. 2). The discharge capacity was calculated from the fifth conditioning cycle and normalized with the weight of the activated carbon on the cathode. The lithium ion capacitor including the carbon 4 sourced cathode showed a resistance of 6.61 ohms (see FIG. 3). The lithium ion capacitor including the carbon 4 sourced cathode had an energy density of 44.24 Wh/l and a power density of 43.91 W/l at about 1 C rate (see FIG. 4).

The pore size measurement results indicated that carbon 1, carbon 3, and carbon 4 had a higher number of pores of less than or equal to 10 Å pore size when compared to comparative carbon 2. A higher number of micropores (e.g., less than or equal to 10 Å) is desired for a carbon to function as the cathode material in a lithium ion capacitor with a $PF_6^-$ ion based electrolyte salt since the higher microporosity (e.g., less than or equal to 10 Å) gives a higher $PF_6^-$ ion specific capacity. The data shows for a high performance LIC device that the cathode must comprise an activated carbon having a pore volume higher than 0.3 $cm^3$/gm pore volume occupied by the micropores (less than 10 Å) and the microporosity (less than 20 Å) should account for greater than 60% of the total pore volume of the activated carbon.

TABLE 3

| EIS data for different activated carbons at 3.8 V. | |
| --- | --- |
| Activated Carbon Type | Resistance (ohms) |
| carbon 1 | 6.01 |
| comparative carbon 2 | 7.35 |
| carbon 3 | 7.51 |
| carbon 4 | 6.61 |

The disclosure has been described with reference to various specific embodiments and techniques. However, it should be understood that many variations and modifications are possible while remaining within the scope of the disclosure.

What is claimed is:

1. A method of making a cathode, comprising:

activating a non-lignocellulosic sourced carbon material at from 500 to 1000° C. for from 1 to 10 hrs, in an inert atmosphere to produce activated particles;

treating the activated particles with an acid, and then neutralizing;

heat treating the neutralized particles at from 500 to 1000° C. for from 1 to 10 hrs, in an inert atmosphere;

mixing the heat treated particles with a binder, and a solvent to form a mixture; and applying the mixture to a conductive current collector to form the cathode.

2. The method of claim 1 wherein the non-lignocellulosic sourced carbon particles are selected from a wheat flour, corn flour, potato flour, rice flour, or a mixture thereof.

3. The method of claim 1 further comprising including a conductive carbon in an amount of from 1 to 8 wt % in the mixture prior to applying the mixture to a conductive current collector to form the cathode.

* * * * *